United States Patent [19]

Midorikawa et al.

[11] Patent Number: 5,953,708
[45] Date of Patent: Sep. 14, 1999

[54] TRANSACTION CONTROL SYSTEM HAVING A TIME DELAY ADJUSTMENT TRANSMISSION MECHANISM

[75] Inventors: Hideyo Midorikawa; Toshiya Kurasaki, both of Kanagawa, Japan

[73] Assignee: Fujitsu Limited, Kawasaki, Japan

[21] Appl. No.: 08/686,652

[22] Filed: Jul. 26, 1996

[30] Foreign Application Priority Data

Oct. 6, 1995 [JP] Japan ................................ 7-260435

[51] Int. Cl.[6] ........................... G06F 17/60; G06F 13/00; G06F 15/00; H04J 3/02
[52] U.S. Cl. .............................. 705/26; 705/35; 705/37; 705/200.62; 705/200.78
[58] Field of Search .................... 705/26, 37, 35; 395/200.62, 200.78

[56] References Cited

U.S. PATENT DOCUMENTS

| | | | |
|---|---|---|---|
| 4,481,626 | 11/1984 | Boggs et al. | 370/445 |
| 4,559,536 | 12/1985 | Olesen et al. | 340/825.07 |
| 4,697,263 | 9/1987 | Beaufoy | 370/458 |
| 4,709,347 | 11/1987 | Kirk | 395/200.78 |
| 4,757,460 | 7/1988 | Bione et al. | 395/200.78 |
| 4,903,201 | 2/1990 | Wagner | 705/37 |
| 4,910,676 | 3/1990 | Alldredge | 705/37 |
| 4,912,706 | 3/1990 | Eisenberg et al. | 370/507 |
| 4,920,503 | 4/1990 | Cook | 395/280 X |
| 4,937,812 | 6/1990 | Itoh et al. | 370/519 X |
| 4,980,826 | 12/1990 | Wagner | 705/37 |
| 5,267,148 | 11/1993 | Kosaka et al. | 705/37 |
| 5,452,436 | 9/1995 | Arai et al. | 395/553 |

FOREIGN PATENT DOCUMENTS

| | | |
|---|---|---|
| 62-48817 | 3/1987 | Japan . |
| 3-101334 | 4/1991 | Japan . |
| 5-22359 | 1/1993 | Japan . |
| 6-209327 | 7/1994 | Japan . |
| 7-154449 | 6/1995 | Japan . |
| 8-272859 | 10/1996 | Japan . |
| 9-222848 | 8/1997 | Japan . |
| 1044603 | 10/1966 | United Kingdom . |
| 2 294 788 | 5/1996 | United Kingdom . |

OTHER PUBLICATIONS

PR Newswire Association, Inc. "Netrix and California Microwave, Inc.'s STS Subsidiary Install Network For Chinese Stock Market", (Feb. 14, 1994).

Kbar, Ghassan and William J. Dewar, "Multicast ATM Switch with Feedback Input Queuing, Priority Sorting Network, and Output Queuing", Proceedings of the International Symposium on Information Theory & Its Applications, Part 1 (of 2), (Nov. 20–24, 1994), p.

Shivakumar, N. and C.J. Sreenan, B. Narendran and P. Agrawal, "The Concord Algorithm for Synchronization of Networked Multimedia Streams", IEEE Comput. Soc. Press, (May 15–18, 1995), pp. 31–40.

(List continued on next page.)

Primary Examiner—Allen R. MacDonald
Assistant Examiner—Pedro R. Kanof
Attorney, Agent, or Firm—Staas & Halsey, LLP

[57] ABSTRACT

A transaction control system is disclosed wherein a center computer is connected through communication circuits with a plurality of terminal devices and wherein the users of the terminal devices do not suffer disadvantages in dealing produced by differences in transmission time with respect to the center computer. With this transaction control system, prior to the ordinary processing, the transmission time required to effect information transmission between the center computer and the various terminal devices is measured. Using the result of this measurement, an adjustment time is then set in each terminal device such as to make the transmission time coincide with a reference time. When in receipt of transaction information, each terminal device displays this transaction information after the lapse of the adjustment time after the time-point of its reception. And when a transaction request is input at each terminal device, this transaction request is transmitted to the center computer when the adjustment time has elapsed after the time-point of its input.

10 Claims, 8 Drawing Sheets

OTHER PUBLICATIONS

Seo, Yeong–Geon and Moon–Ryul Jung and Hae–Seok Oh, "Sending, Receiving and Presenting Multimedia Data over Network for Tele–medical Diagnosis (MediNet)", IEEE, (Oct. 30–Nov. 1, 1996), pp. 18–25.

Lo, F.L. and T.S. Ng and T.I.Yuk, "Performance Analysis of a Slotted CDMA ALOHA Network", International Journal of Wireless Information Networks, vol. 3, No. 4 (Oct. 1996), pp. 195–202.

Okamoto, Garret and Guanghan Xu, "The Smare Wireless LAN System: Physical Layer Design and Results", 1997 IEEE 47th Vehicular Technology Conference: Technology in Motion, vol. 3, (1997), pp. 1312–1316, May 1997.

5,953,708

TRANSACTION CONTROL SYSTEM HAVING A TIME DELAY ADJUSTMENT TRANSMISSION MECHANISM

BACKGROUND OF THE INVENTION

1. Field of the Invention

The present invention relates to a transaction control system employed for performing transactions such as in securities or foreign exchange, and to a center computer used in a transaction control system.

2. Description of the Related Art

In a market in which trading of some products is carried on, participants in the market present to all other participants transaction information (orders) for buying and/or selling. Participants who have received presentation of transaction information may respond to "buy" transaction information by indicating their intention to sell or may respond to "sell" transaction information by indicating their intention to buy. Thus, transactions are set up by a presenter of transaction information receiving such indications of intention (hereinbelow referred to as "transaction requests"). Under these circumstances, when transaction requests are issued by a plurality of participants, the participant who transmitted his transaction request earliest to the presenter of the transaction information is given the right to make the transaction, under the "time priority" rule.

In recent years, such transactions are being performed using transaction control systems utilizing communication circuits. The construction and operation of a prior art transaction control system is described below with reference to FIG. 8.

As shown in the drawings, a prior art transaction control system has a construction in which a center computer 300 and a plurality of terminal devices 310a and 310b are connected by communication circuits 120. Center computer 300 is equipped with a transaction information transmission unit 301 and a transaction request receiving unit 302. Also, each terminal device 310a and 310b is equipped with a transaction information receiving unit 311 and transaction request transmission unit 312.

The transaction information transmission unit 301 in center computer 300 transmits simultaneously to all terminal devices 310a and 310b transaction information signals corresponding to "sell" or "buy" transaction information which it receives as input.

Transaction information receiving unit 311 in each terminal device 310a and 310b receives transaction information signals from center computer 300 and outputs (display or printing) transaction information corresponding to the transaction information signals that it has received. The user of the terminal device 310a and 310b decides whether or not to issue a transaction request after studying the details of the transaction information which has thus been output. If he has decided to issue a transaction request, the user inputs a transaction request in respect of this transaction information at terminal device 310. Transaction request transmission unit 312 in terminal device 310 sends a transaction request signal corresponding to the transaction request that has been input to center computer 300.

On receiving the transaction request signals from the various terminal devices 310, transaction request receiving unit 302 in center computer 300 outputs transaction requests corresponding to these transaction request signals. Center computer 300 is set up such that a transaction contract is established with respect to the transaction request that is first received by transaction request receiving unit 302.

Now, in such a transaction control system, the various terminal devices 310 are arranged in various locations. The information transmission time between center computer 300 and the terminal devices 310 therefore takes respectively different values.

For example, if center computer 300 is provided in Tokyo while terminal device 310a and terminal device 310b are respectively provided in Osaka and London, if center computer 300 and terminal device 310b are connected by a communication circuit through the U.S. by a so-called Eastward link, the information transmission time between Tokyo and London is a few tens of milliseconds longer than the information transmission time between Tokyo and Osaka.

Consequently, terminal device 310a in Osaka receives transaction information sent from center computer 300 earlier than terminal device 310b in London. The user of terminal device 310a in Osaka can therefore get the transaction information earlier than the user of terminal device 310b in London.

Also, if a transaction request is sent simultaneously from terminal device 310a in Osaka and terminal device 310b in London, center computer 300 in Tokyo will receive the transaction request from terminal device 110a in Osaka first. That is, even if the input times at terminal devices 310 are the same, center computer 300 will identify the transaction request from the terminal device 110a in Osaka as having been issued earlier and so will process this transaction request with priority.

Thus, with the conventional transaction control system, users of terminal devices 310 whose information transmissions took some time to reach center computer 300 were at a disadvantage in dealing.

SUMMARY OF THE INVENTION

An object of the present invention is to provide a transaction control system whereby all market participants can be given equitable dealing opportunities.

In the first transaction control system of the present invention, processing to compensate for the difference in transmission time between the center computer and the various terminal devices is performed within the terminal devices. With the first transaction control system, a center computer is employed of the same function as the center computer employed in the conventional transaction control system. That is, a center computer constituting a first transaction control system is equipped with a transaction information transmission unit that simultaneously sends transaction information to a plurality of terminal devices through communication circuits, and with a transaction request receiving unit that receives transaction requests sent by the terminal devices through communication circuits.

Thus, in the first transaction control system, terminal devices are employed that are equipped with an adjustment time setting unit, a transaction information receiving unit, a transaction information display unit, a transaction request input unit, and a transaction request transmission unit. The adjustment time storage unit stores the adjustment time, which is determined in accordance with the difference between the transmission time required for exchange of information with the center computer and a reference time representing a standard transmission time. The transaction information receiving unit receives transaction information sent by the center computer. The transaction information display control unit displays transaction information received by the transaction information receiving unit on the transaction information display unit after the lapse of the adjustment time which is stored in the adjustment time storage unit from the time point of its reception. The transaction request input unit is used to input transaction requests. The transaction request transmission unit transmits to the center computer a transaction request that was input by the transaction request input unit, when the adjustment time, which is stored in the adjustment time storage unit, has elapsed after the time point of input of the transaction request.

That is, the terminal devices within the first transaction control system display the transaction information which they have received, delayed by the adjustment time, which is determined in accordance with the time necessary for the transmission of information between themselves and the center computer. The terminal devices also delay transmission processing by the amount of the adjustment time, when transmitting a transaction request. Consequently, in the first transaction control system, transaction information transmitted by the center computer is displayed simultaneously on all terminal devices. Also, all transaction requests, whichever terminal device they are input from, will be received by the center computer at the same time after input. With the first transaction control system, the users of all the terminal devices can therefore participate equitably in the market without being affected by the location where the terminal device is situated.

With the second transaction control system of the present invention also, a center computer of the same function as the center computer employed in the conventional transaction control system is used. But with the second transaction control system, terminal devices are employed that performs a different action from the terminal devices in the first transaction control system. The terminal devices employed in the second transaction control system are equipped with an adjustment time storage unit, a transaction information receiving unit, a transaction information display unit, a transaction request input unit, and a transaction request transmission unit.

The adjustment time storage unit stores an adjustment time that is determined in accordance with the difference between the back-and-forth transmission time required for information exchange with the center computer and a reference time which constitutes a reference for the back-and-forth transmission time. The transaction information receiving unit receives transaction information transmitted by the center computer. The transaction information display unit displays transaction information received by the transaction information receiving unit. When the adjustment time stored in the adjustment time storage unit has elapsed from the input time point, the transaction request transmission unit sends to the center computer the transaction request that was input by the transaction request input unit.

Specifically with the terminal devices constituting the second transaction control system, delay processing is performed by the amount of the transmission time for a transaction request. With this system, it is not possible for the users of all the various terminal devices to acquire transaction information simultaneously. However, when users of the various terminal devices immediately input a transaction request in respect of transaction information, the center computer receives these transaction requests simultaneously. Consequently, with this construction, equality of transaction opportunity can be guaranteed.

With the third transaction control system of the present invention also, a center computer with the same functions as the center computer used in the prior art transaction control system is employed. But terminal deveices that performs different actions from the terminal devices of the first or second transaction control system is employed in the third transaction control system. The terminal devices used in the third transaction control system are equipped with an adjustment time storage unit, a transaction information receiving unit, a transaction information display unit, a transaction request input unit and a transaction request transmission unit.

The adjustment time storage unit stores the adjustment time, which is determined in accordance with the difference between the back-and-forth transmission time necessary to perform information exchange with the center computer and the reference time which is a reference for the back-and-forth transmission time. The transaction information receiving unit receives the transaction information transmitted by the center computer. After the adjustment time stored in the adjustment time storage unit has elapsed from the time point of its reception, transaction information display unit supplies the transaction information received by the transaction information receiving unit to the transaction information display unit, so that the details of the transaction information are displayed by the transaction information display unit. The transaction request transmission unit sends to the center computer the transaction request that is input by the transaction request input unit.

That is, the terminal devices constituting the third transaction control system perform delay processing by the amount of the time taken to receive the transaction information. With this system, the users of the terminal devices cannot acquire transaction information simultaneously. However, if the users of the various terminal devices input transaction requests in respect of transaction information immediately, these transaction requests will be received simultaneously by the center computer. Consequently, equality of transaction opportunity can be guaranteed with this construction also.

It should be noted that a system wherein setting of the adjustment time can be performed in an active manner can be formed by adding to the center computer in the first transaction control system a first transmission time measurement unit, a reference time setting unit, and a reference time transmission unit, and by adding to each terminal device a reference time receiving unit, second transmission time measurement unit, and adjustment time setting unit. These units act as follows.

The first transmission time setting unit measures for a plurality of terminal devices respectively the first transmission time, which is the time required for information exchange. The reference time setting unit sets as the reference time the longest of the first transmission times for the various terminal devices measured by the first transmission time measurement unit. The reference time transmission unit sends to all the terminal devices the reference time that is set by the reference time setting unit.

The reference time receiving unit receives the reference time that is transmitted by the reference time transmitting unit in the center computer. The second transmission time measurement unit measures the second transmission time, which is the time needed for information exchange with the center computer. The adjustment time setting unit takes as the adjustment time half of the value obtained by subtracting the second transmission time measured by the second transmission time measurement unit from the reference time received by the reference time receiving unit, and sets this in the reference time storage unit.

When the reference time setting unit etc are added, it is also possible to add to the center computer a reference time display unit that displays the reference time that is set by the reference time setting unit, and a reference time input unit for inputting a new reference time. In this case, as the reference time transmission unit, a unit can be employed that transmits to the various terminal devices the reference time that is input by this reference time input unit.

Whichever of the first to the third center computers described below is employed, a transaction control system can be constituted that is capable of providing equitable dealing opportunities to all market participants.

The first center computer of the present invention is equipped with an adjustment time storage unit, a transaction information transmission unit, and a transaction request receiving unit. The adjustment time storage unit stores the adjustment times which are respectively associated with a plurality of terminal devices and which are determined in accordance with the difference between the transmission time required for exchange of information with the corresponding terminal device and the reference time, which is the reference for the transmission time. The transaction information transmission unit transmits input transaction information after the lapse of the various adjustment times stored in the adjustment time storage unit from the time point when the transaction information was input, to the terminal device corresponding to this adjustment time. The transaction request receiving unit receives a transaction request constituting response information in respect of transaction information transmitted from the various terminal devices and outputs the received transaction information when the adjustment time stored in the adjustment time storage unit has elapsed after the time point of its reception.

That is, the first center computer of the present invention, when transmitting transaction information or when receiving transaction requests, executes delay processing to alter the delay time in accordance with the terminal device in question. The transaction information therefore arrives simultaneously at all the terminal devices that are connected to the center computer. Also, whichever the terminal device at which a transaction request is input, it is output when the same time has elapsed after input, to be employed as information for dealing. Consequently, with the transaction control system using this first center computer, users of all the terminal devices can participate equitably in the market without being affected by the location where the terminal device is situated.

The second center computer of the present invention is equipped with an adjustment time storage unit, a transaction information transmission unit, and a transaction request transmission unit. Adjustment time storage unit stores the adjustment times that are respectively associated with a plurality of terminal devices and are determined in accordance with the difference between the back-and-forth transmission time required for exchange of information with the corresponding terminal device and the reference time which is the reference for the back-and-forth transmission time. The transaction information transmission unit sends the input transaction information to the terminal device corresponding to the adjustment time after there has elapsed the respective adjustment time stored in the adjustment time storage unit, from the time point where the transaction information was input. The transaction request receiving unit receives transaction requests constituting response information in respect of transaction information received by the terminal devices, and outputs this transaction information which it has received.

Specifically, with the second center computer, delay processing is performed by the amount of the time required for transmission of the transaction information. With a transaction control system using this center computer, users of the terminal devices cannot acquire transaction information simultaneously. However, if users of the various terminal devices input transaction requests in respect of transaction information immediately on its receipt, these transaction requests are received simultaneously by the center computer. Consequently, by using this second center computer, a transaction control system can be constituted wherein equality of dealing opportunity can be guaranteed.

The third center computer of the present invention is equipped with an adjustment time storage unit, transaction information transmission unit, and transaction request receiving unit. The adjustment time storage unit stores adjustment times respectively associated with a plurality of terminal devices, and which are determined in accordance with the difference between the back-and-forth transmission time required for exchange of information with the corresponding terminal device and the reference time which is a reference for the back-and-forth transmission time. The transaction information transmission unit sends the input transaction information simultaneously to a plurality of terminal devices. The transaction request receiving unit receives transaction requests constituting response information in respect of transaction information transmitted by the terminal devices and outputs this received transaction information when the adjustment time stored in the adjustment time storage unit has elapsed after the time point of its reception.

In other words, the third center computer performs delay processing by the amount of the time required for reception of a transaction request. With a transaction control system employing this center computer, the user of the terminal devices cannot acquire transaction information simultaneously. However, if the users of the terminal devices input transaction requests in respect of transaction information immediately on receiving it, the center computer will receive these transaction requests simultaneously. Consequently, by using this third center computer, a transaction control system can be constructed that enables equality of dealing opportunity to be guaranteed.

Also, a center computer can be formed wherein active setting of the adjustment time is carried out by adding to the first center computer a transmission time measurement unit, reference time setting unit and reference time transmission unit. These units act as follows.

The transmission time measurement unit measures for a plurality of terminal devices respectively a first transmission time, which is the time needed for information exchange. Reference time setting unit sets as the reference time the longest of the first transmission times for the respective terminal devices measured by the transmission time measurement means. The adjustment time setting unit sets in the adjustment time storage means as adjustment time for each terminal device half of the value obtained by subtracting the respective first transmission time measured by the transmission time measurement means from the reference time set by the reference time setting means.

Also, if a reference time setting unit etc are added, it is also possible to add to the center computer a reference time display unit for displaying the reference time set by the reference time setting unit and a reference time input unit for inputting a new reference time. In this case, as the reference time setting unit, a unit may be employed that uses the reference time which is input by this reference time input unit to calculate the adjustment time.

DETAILED DESCRIPTION OF THE PREFERRED EMBODIMENTS

A concrete description of the present invention is given below with reference to the drawings.

First Embodiment

Figure 1:
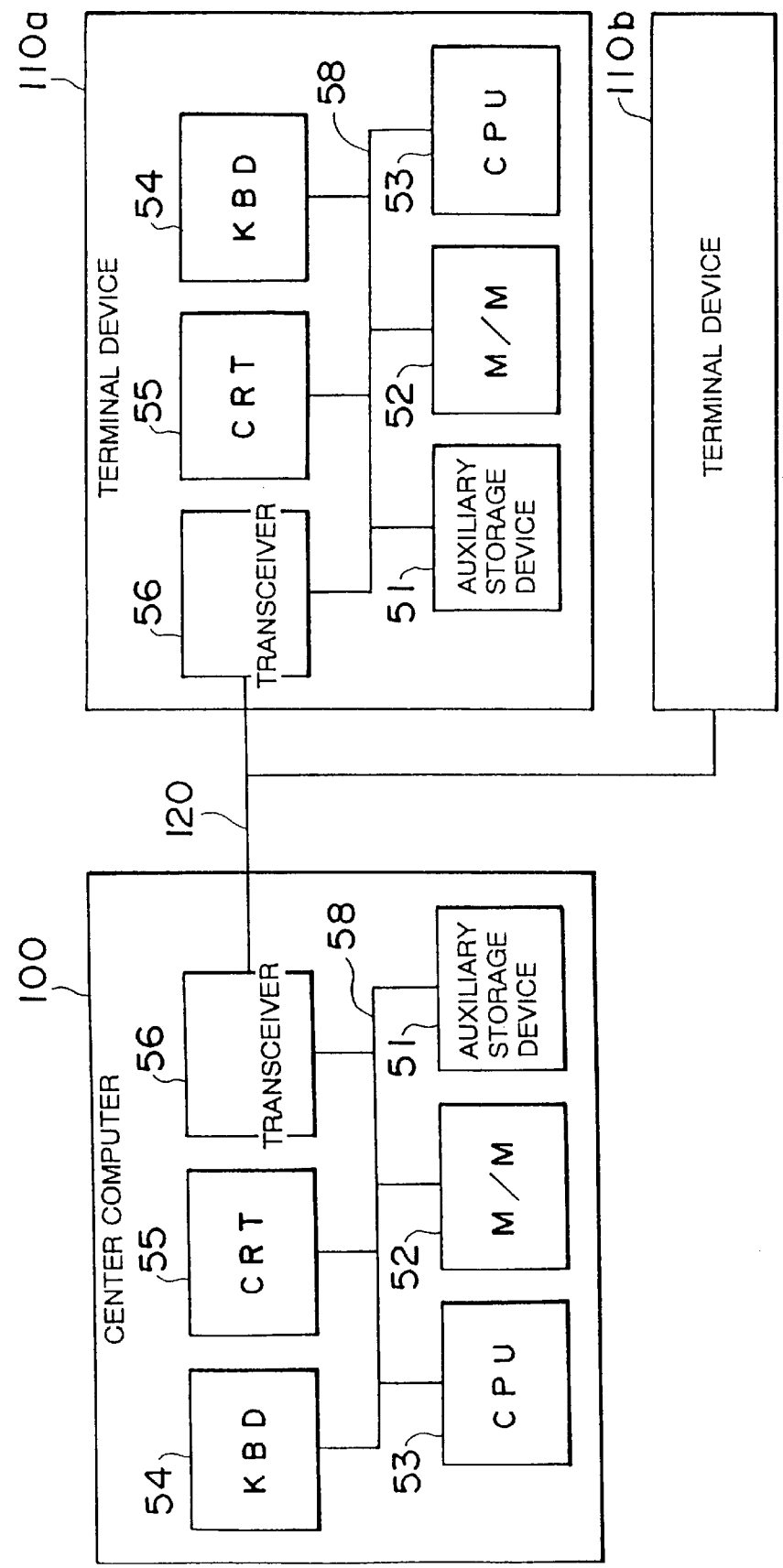
FIG. 1 is a hardware layout diagram of a transaction control system according to a first embodiment of the invention.

FIG. 1 shows the hardware layout of a transaction control system of the first embodiment. As shown in the Figure, the transaction control system of the first embodiment is constituted of center computer 100, a plurality of terminal devices 110, and communication circuits 120.

Center computer 100 and terminal devices 110 are respectively equipped with auxiliary memory devices 51, main memory (M/M) 52, CPU (central processing unit) 53, keyboard (KBD) 54, CRT (cathode ray tube) 55, transceiver 56, and system bus 58.

Transceiver 56, which is provided in each device, is a circuit which performs processing to convert data in a form that can be processed by CPU 53 (transaction information and/or transaction requests etc) into signals for communication and to transmit the converted signals, and which performs processing to convert received signals into data. As shown in the Figure, transceiver 56 in center computer 100 is connected by communication circuits 120 with transceivers 56 in each terminal device 110. In this system, telephone circuits are employed as communication circuits 120 and what is called a modem is employed as transceiver 56.

Auxiliary storage device 51 is a device for storing a program that lays down the operating procedure of CPU 53. In auxiliary storage device 51 in center computer 100, there is stored a program for the center computer, and in the auxiliary storage devices 51 of each terminal device 110, there is stored a program for the auxiliary storage device.

When the power source is connected, CPU 53 in each device loads the program in auxiliary storage device 51 into a prescribed storage region in main memory 52. The CPUs 53 in each device then commence control of the various units in accordance with the programs that have respectively been loaded so that the system consisting of center computer 100, terminal devices 110 and communication circuits 120 is activated as a transaction control system.

Figure 2:
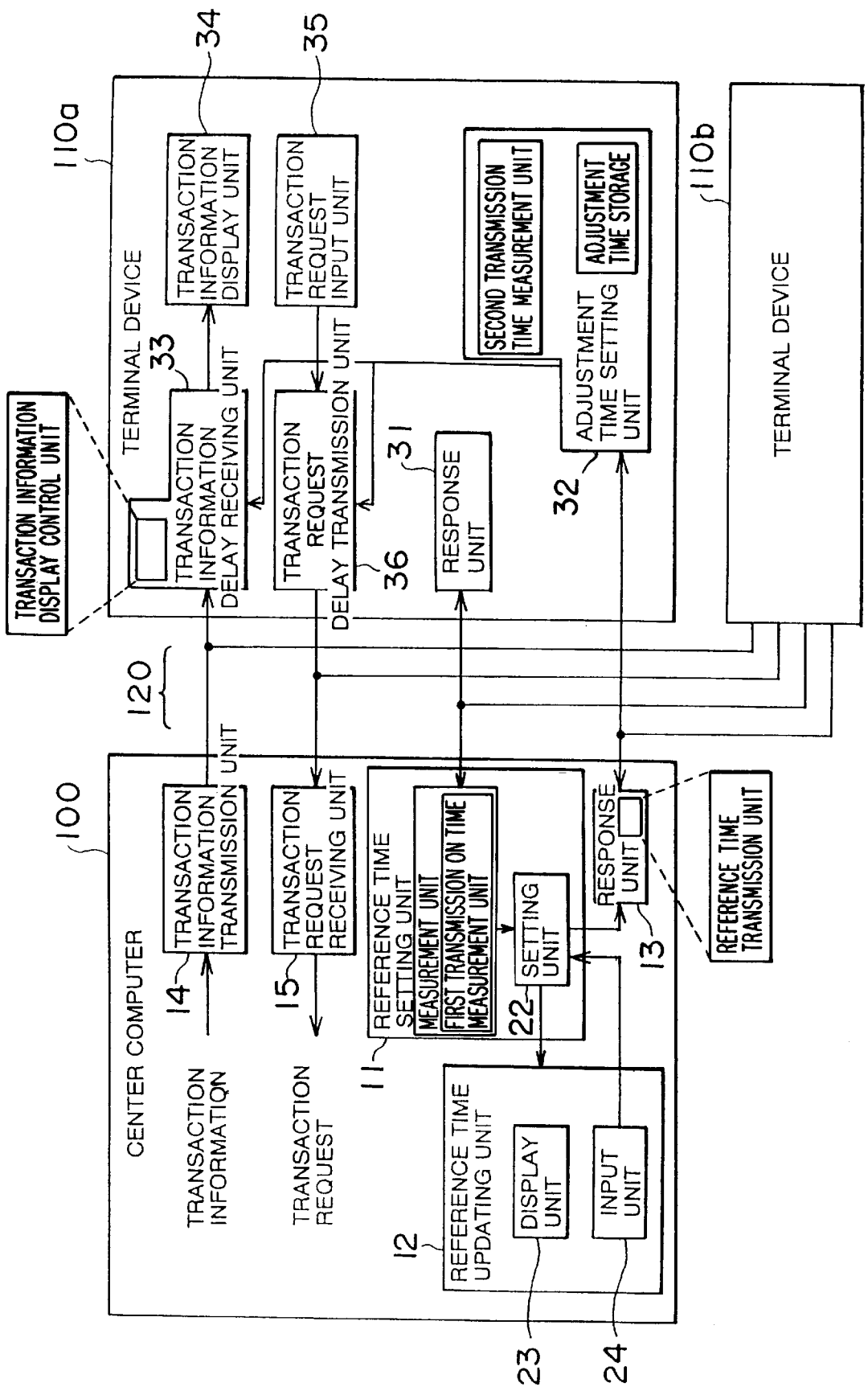
FIG. 2 is a functional block diagram of the transaction control system of the first embodiment.

A specific description of the operation of the transaction control system of the first embodiment is given below. First of all, the operation of this transaction control system will be described using the function block diagram shown in FIG. 2. Description of the correspondence relationship between the various function blocks and the actual hardware will be left until later.

As shown in the Figure, CPU 53 in center computer 100 operates center computer 100 as a device consisting of reference time setting unit 11, reference time updating unit 12, response unit 13, transaction information transmission unit 14, and transaction request receiving unit 15. Also, CPU 53 in terminal device 110 operates terminal device 110 as a device consisting of response unit 31, adjustment time storage unit 32, transaction information delay receiving unit 33, transaction information display unit 34, transaction input unit 35, and transaction request delay unit transmission unit 36.

Reference time setting unit 11 in center computer 100 is provided with a measurement unit 21 and setting unit 22. Measurement unit 21 is connected through communication circuits 120 with response unit 31 in each terminal device 110. Setting unit 22 is connected to response unit 13 and reference time updating unit 12, provided with display unit 23 and input unit 24. Response unit 13 is connected through communication circuits 120 with adjustment time response unit 32 in each terminal device 110. Transaction information transmission unit 14 and transaction request receiving unit 15 are respectively connected through communication circuits 120 with transaction information delay receiving unit 33 and transaction request delay transmission unit 36 in each terminal device 110.

Transaction information delay receiving unit 33 and transaction request delay transmission unit 36 in each terminal device 110 are connected respectively to transaction information display unit 34 and transaction request input unit 35. Also, transaction information delay receiving unit 33 and transaction request delay transmission unit 36 are connected to adjustment time setting unit 32.

The time sequence of the operation of the various units is explained below.

The processing that is executed by this system can be broadly divided into the initial period processing in which center computer 100 and terminal devices 110 are actuated and which is executed when communication between the devices is established, and ordinary processing, which is executed after the initial period processing.

The initial period processing is the processing for setting the adjustment time, which is information employed during ordinary processing, in each terminal device 110. In the initial period processing, reference time setting unit 11 in center computer 100, reference time updating unit 12, response unit 13, response unit 31 within terminal device 110, and adjustment time setting unit 32 perform their function. The details of the operation of the various units on initial period processing are given below.

In the initial period processing, measurement unit 21 in reference time setting unit 11 sends a first measurement signal simultaneously to all the response units 31 in terminal devices 110, and commences to count the lapsed time. After this, every time it receives a first response signal from a response unit 31 in each terminal device 110, measurement unit 21 outputs the lapsed time which is being counted to setting unit 22 as the first transmission time relating to this terminal device 110.

In parallel with this, the response unit 31 of each terminal device 110, after communication with center computer 100 has been established, commences processing to monitor transmission of the first measurement signal by measurement unit 21. Once it detects reception of this first measurement signal, reception unit 31 immediately sends a first response signal to measurement unit 21.

That is, measurement unit 21 in center computer 100 measures the time needed for information exchange with each terminal device and outputs this measured time as respective first transmission time to setting unit 22.

When it has received first transmission times in respect of all the terminal devices 110, setting unit 22 stores the longest first transmission time of these first transmission times as reference time. Next, setting unit 22 outputs the reference time and the first transmission time in respect of each terminal device 110 to reference time updating unit 12.

When the reference time and first transmission time relating to each terminal device 110 are supplied from setting unit 22, reference time updating unit 12 displays these items of information on display unit 23. Next, reference time updating unit 12 displays a message on display unit 23 asking whether or not the reference time is to be updated, and shifts to a condition of standing by for data input from input unit 24.

After this, if a new reference time is input from input unit 24, reference time updating unit 12 rewrites the reference time in setting unit 22 with this reference time, and terminates operation. On the other hand, if information indicating that updating of the reference time is not required is input, reference time updating unit 12 terminates its operation without rewriting the reference time.

Specifically, when the reference time and/or first transmission times are displayed on display unit 23, the system manager (user of the center computer) can make a decision based on these values and/or other circumstances as to whether a reference time of a suitable value has been set or not. If the system manager then decides that a reference time of suitable value has not been set, he inputs a new reference time using input unit 24. In this case, reference time updating unit 12 stores the reference time that was input from input unit 24 in setting unit 22. Also, if he decides that the value of the reference time is normal, the system manager inputs prescribed information indicating this from input unit 24. In this case, reference time updating unit 12 terminates operation without rewriting the reference time.

After a prescribed time has elapsed after the transmission of the first response signal by response unit 31, adjustment time setting unit 32 in each terminal device 110 sends a second measurement signal to response unit 13 in center computer 100, and starts to count the lapsed time.

When it has received the second measurement signal, the response unit 13 within the center computer, if the second measurement signal has been received, immediately sends the second response signal to terminal devices 110 which transmitted this second measurement signal. Next, response unit 13 transmits to these terminal devices 110 a reference time signal indicating the reference time which is stored in setting unit 22.

Consequently, adjustment time setting unit 32 in each terminal device 110 receives a second response signal and reference time signal after transmission of the second measurement signal. Adjustment time setting unit 32 stores, as second transmission time the time required until the second response signal is received, and recognizes the reference time based on the reference time signal that is subsequently received.

It should be noted that, in this system, for the second measurement signal and second response signal, signals are employed that are respectively equal in length to the first measurement signal and first response signal. The second transmission time measured by adjustment time setting unit 32 in terminal device 110x will therefore normally have the same value as the first transmission time measured in respect of this terminal device 110a by measurement unit 21 in center computer 100.

After it has acquired the second transmission time and the reference time, adjustment time setting unit 32 calculates the adjustment time from these items of information using the following equation, and stores this calculated adjustment time:

Adjustment time=(reference time minus second transmission time)/2

However, if a negative adjustment time is obtained by the above equation, adjustment time setting unit 32 stores "0" as the adjustment time.

When this adjustment time calculation has been completed by the terminal devices 110, initial period processing is completed, and this system assumes a condition in which ordinary processing can be executed.

The ordinary processing can be broadly divided into transaction information notification processing and transaction request notification processing.

First of all, the operation when performing transaction information notification processing will be described. Transaction information notification processing is commenced by transaction information transmission unit 14 in center computer 100 when transaction information it is to be notified to market participants is generated. When performing transaction information notification processing, transaction information transmission unit 14 in center computer 100, transaction information delay receiving unit 33 in each terminal device 110 and transaction information display unit 34 function as described below.

Transaction information transmission unit 14 in center computer 100 sends a transaction information signal corresponding to the transaction information that is to be notified to market participants simultaneously to all terminal devices 110 through communication circuits 120.

Transaction information delay receiving unit 33 in each terminal device 110 stores the transaction information corresponding to the transaction information signal received through communication circuits 120 and commences counting of the lapsed time. Then, when the adjustment time stored in adjustment time setting unit 32 has elapsed, transaction information delay receiving unit 33 outputs the transaction information to transaction information display unit 34. Transaction information display unit 34 displays on its screen the transaction information that is supplied from transaction information delay receiving unit 33.

That is, if a transaction information signal is received, each terminal device 110 displays the details of this transaction information signal to the user after the lapse of the adjustment time from the time point of actual receipt of the signal.

Next, the operation when transaction request notification processing is performed will be described. Transaction request notification processing is commenced when a transaction request is input to transaction request input 35 in terminal device 110. In transaction request notification processing, transaction request input unit 35 and transaction request delay transmission unit 36 in each terminal device 110 and transaction information receiving unit 15 in center computer 100 function as described below.

Transaction request input unit 35 outputs to transaction request delay transmission unit 36 a transaction request that was input by a market participant. Transaction request delay transmission unit 36, when a transaction request is input from transaction request input unit 35, stores the transaction request that has been input and starts counting the lapsed time. When the adjustment time stored in adjustment time setting unit 32 has elapsed, transaction request delay transmission unit 36 sends to center computer 100 a transaction request signal corresponding to the stored transaction request.

That is, each terminal device 110, if a transaction request is input, sends a transaction request signal corresponding to this transaction request to center computer 100 after the lapse of the adjustment time after the actual time point of input of the request.

Transaction request receiving unit 15 in center computer 100 receives transaction request signal from each terminal device 110 and converts these received transaction request signals into transaction requests, which it then outputs. Transaction requests output by this transaction request receiving unit 15 are processed in the order in which they are output by a mechanism, not shown, within center computer 100.

Figure 3:
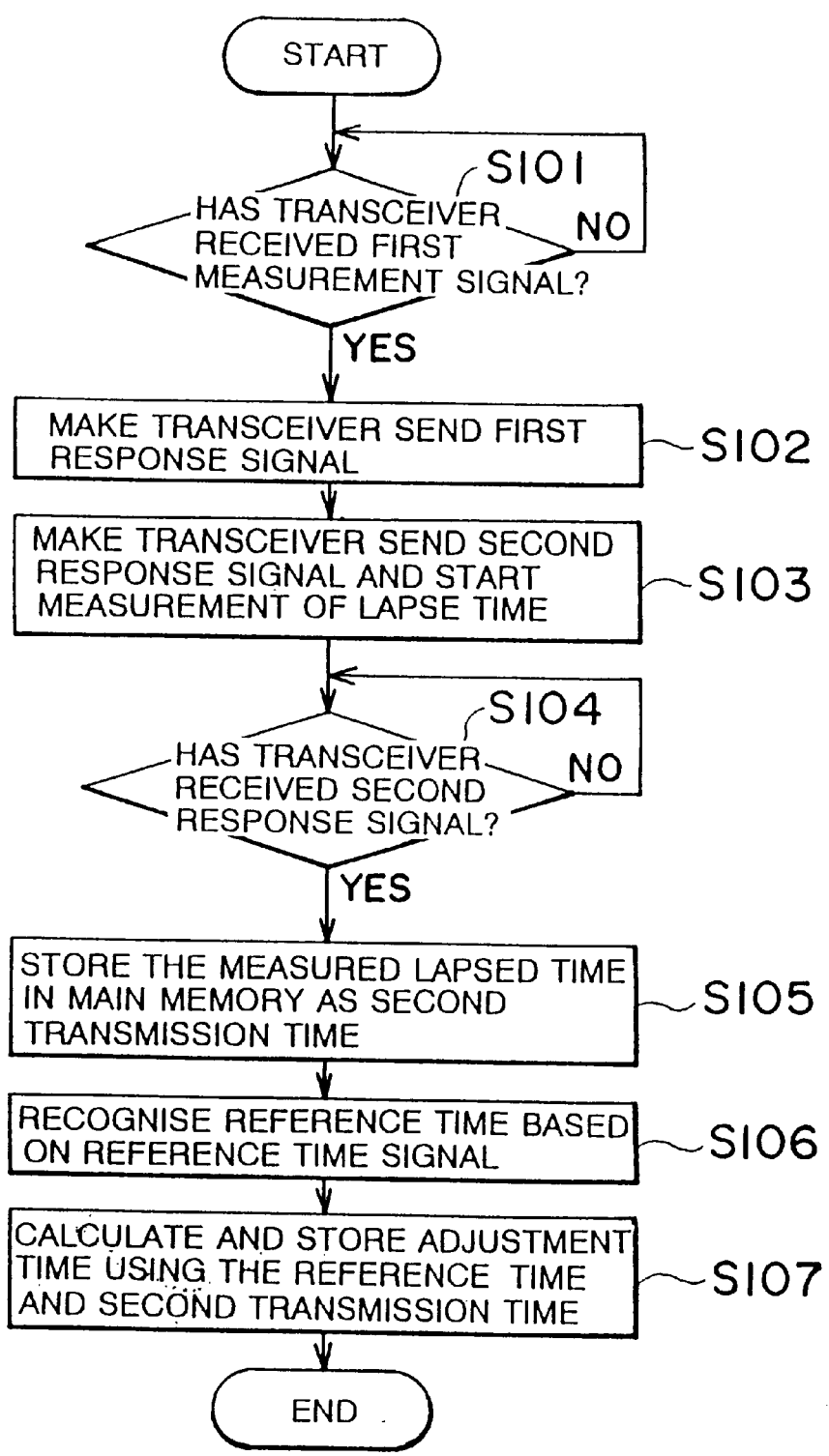
FIG. 3 is a flow chart given in explanation of the operation on initial period processing of the terminal devices in the transaction control system of the first embodiment.
Figure 4:
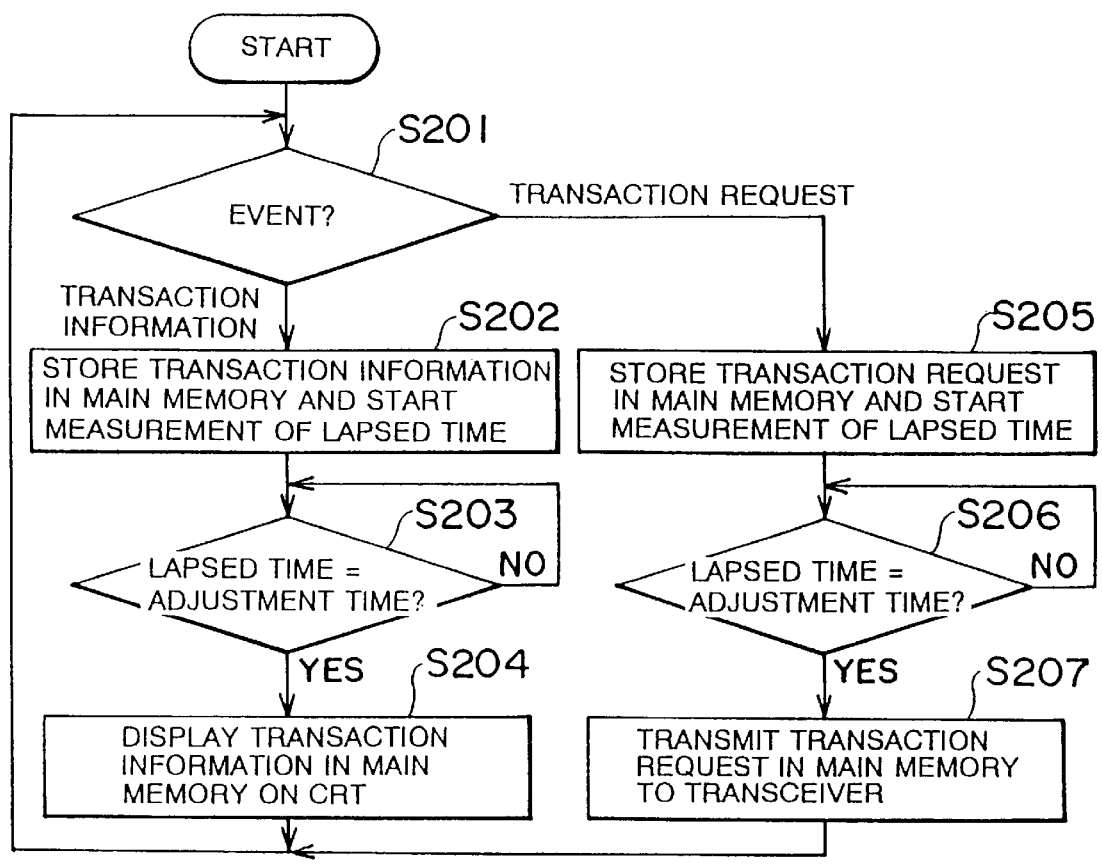
FIG. 4 is a flow chart given in explanation of the operation during ordinary processing of the terminal devices in the transaction control system of the first embodiment.

The correspondence relationship between the various functional blocks and the actual hardware structure will now be explained. The correspondence relationship between the various functional blocks and the hardware structure will now be described using FIG. 3 and FIG. 4, taking terminal device 100 as example. FIG. 3 is a flow chart showing the operating procedure of CPU 53 in terminal device 110 during initial period processing. FIG. 4 is a flow chart showing the operating procedure of CPU 53 in terminal device 110 in ordinary processing.

As shown in FIG. 3, after a communication circuit with center computer 100 has been established, CPU 53 in the terminal device waits for reception of first measurement signal by transceiver 56 (step S101). Then, when this first measurement signal is received by transceiver 56 (step S101; Y), CPU 53, under the control of transceiver 56, sends the first response signal destined for center computer 100 to transceiver 56 (step S102).

That is, CPU 53 and transceiver 56 in terminal device 110 act as response unit 31.

When a prescribed time has passed after transmission of the first response signal, CPU 53 sends a second measurement signal destined for center computer 100 to transceiver 56, and commences counting of the lapsed time (step S103). Then, when the second response signal has been received by transceiver 56 (Step S104), CPU 53 terminates the counting of the lapsed time and stores the lapsed time that has been counted as the second transmission time (step S103). Next, CPU 53 recognizes (step 106) the reference time determined in center computer 100 on the basis of the reference time signal, which is received after the second measurement signal. Then, CPU 53 calculates the adjustment time from the reference time and second transmission time and stores this calculated adjustment time in main memory 52 (step S107).

That is, CPU 53, transceiver 56 and main memory 52 in terminal device 110 function as adjustment time setting unit 32.

After storing the adjustment time, CPU 53 starts operation in accordance with the flow shown in FIG. 4.

That is, CPU 53 commences monitoring (step S201) for the occurrence of the event: reception of a transaction information signal or input of a transaction request. When reception of a transaction information signal by transceiver 56 is detected (step S201; transaction information), CPU 53 stores the transaction information that is output by transceiver 56 in main memory 52, and starts counting the lapsed time (step S202). When the lapsed time is equal to the adjustment time that is stored in main memory 52 (step S203; Y), CPU 53 displays the transaction information on CRT 55 (step S204). It then returns to step S201 and continues monitoring for reception of a transaction information signal or input of a transaction request.

When input of a transaction request from keyboard 54 is detected (step S201; transaction request), CPU 53 stores this transaction request in main memory 52, and starts counting lapsed time (step S205). Then, when the lapsed time is equal to the adjustment time (step S206; N), by controlling transceiver 56, it transmits a transaction request signal corresponding to the transaction request to center computer 100 (step S207).

That is, CRT 55 and keyboard 54 in terminal device 110, under the control of CPU 53, respectively function as transaction information display unit 34 and transaction request input unit 35. Also, CPU 53, transceiver 56 and main memory 52 function as transaction information delay receiving unit 33 and transaction request delay transmission unit 36.

A more detailed description of the operation of the transaction control system of the first embodiment will now be given using the signal sequence diagram (FIG. 5) below. It will be assumed that the center computer in FIG. 5 is located in Tokyo while the two terminal devices a, b are respectively located in Osaka and London.

As already described, with this transaction control system, initial period processing is executed after communication has been established between the center computer and the terminal devices.

Figure 5:
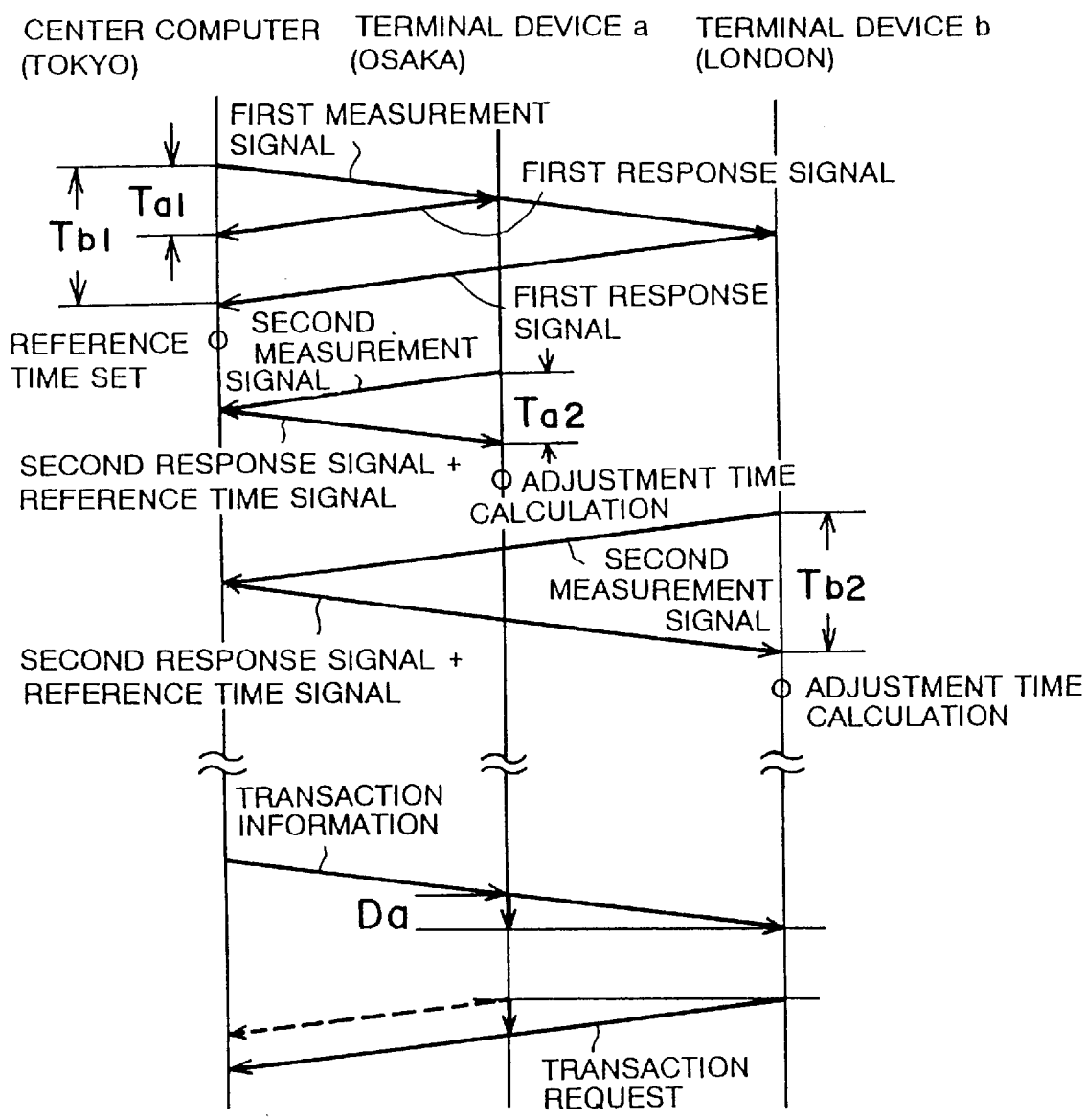
FIG. 5 is a signal sequence diagram in a transaction control system according to the first embodiment.

In the initial period processing, as shown diagrammatically in FIG. 5, the center computer first of all sends a first measurement signal simultaneously to the terminal devices. The center computer then measures for each terminal the time (first transmission time) from the transmission of the first measurement signal up to the arrival of the first response signal. The center computer then stores the longest of these measured first transmission times as reference time.

For example, if the first transmission time Ta1 relating to terminal device a located in Osaka is 0.7 seconds, while the first transmission time Tb1 relating to terminal device b located in London is 1.0 seconds, the center computer stores as reference time the first transmission time Tb1 (=1.0 seconds) relating to terminal device b.

Terminal devices a, b then transmit a second measurement signal to the center computer.

When it has received the second measurement signal, the center computer then transmits to the terminal devices that have transmitted the second measurement signal a second response signal and reference time signal.

Terminal devices a, b respectively measure the time (second transmission time) from transmission of the second measurement signal up to reception of the second response signal. Each of these terminal devices also acquires the reference time, which is based on the reference time signal, which they receive together with the second response signal. Each terminal device then calculates an adjustment time based on the difference between the reference time and second transmission time, and stores this calculated adjustment time.

If the first transmission time Ta1 is 0.7 seconds and the first transmission time Tb1 is 1.0 seconds, normally the second transmission time Ta2 measured by terminal device a will be 0.7 seconds and the second transmission time Tb2 measured by terminal device b will be 1.0 seconds. Also, unless the reference time is altered by the system manager, each terminal device will transmit a reference time signal indicating that the reference time is 1.0 seconds.

Consequently, terminal device a stores, as the adjustment time Da, 0.15 seconds (=(1.0−0.7)/2). Also, terminal device b stores an adjustment time Db of 0 seconds (=(1.0−1.0)/2).

Thus, ordinary processing is commenced after the adjustment times have been set in the respective terminal devices.

For example, when performing transaction information notification processing, the transaction information signals from the center computer are processed as follows by each terminal device.

Since the first (second) transmission time in respect of the terminal device a is 0.7 seconds, terminal device a recognizes reception of transaction information (signal) 0.35 (=0.7/2) seconds after the transmission of a transaction information signal by the center computer. And since the adjustment time Da stored in terminal device a is 0.15 seconds, terminal device a displays the details of this transaction information after the lapse of 0.15 seconds after recognition of the reception of the transaction information. That is, terminal device a divulges the details of the transaction information to the market participant after a time of 0.5 (=0.35+0.15) seconds has elapsed after transmission of the transaction information signal by the center computer.

In contrast, since the first (second) transmission time relating to terminal device b is 1.0 seconds, terminal device b recognizes reception of transaction information (signal) after 0.5 (=1.0/2) seconds after the transmission of the transaction information signal by the center computer. Then, since the adjustment time Db stored in terminal device b is 0 seconds, terminal device b, on recognizing the reception of transaction information, displays the details of this transaction information immediately (waiting for 0 seconds). That is, terminal device b divulges the details of the transaction information to the user of terminal device b after the lapse of 0.5 (=0.5+0) seconds after the transmission of the transaction information by the center computer.

Also, in processing a transaction request notification, the transaction requests that are input by each terminal device are processed as follows.

If a transaction request is input, terminal device a, since adjustment time Da is 0.15 seconds, sends a transaction request signal to the center computer 0.15 seconds later than input of the request. Since the time required for this transaction request signal to reach the center computer is 0.35 (=0.7/2) seconds, the transaction request from terminal device a arrives at the center computer at a time 0.5 (=0.15+0.35) seconds after the time point of its input.

In contrast, since the adjustment time Db of terminal device b in London is 0 seconds, terminal device b sends the transaction request signal when the transaction request is input. Consequently, the transaction request from terminal device b will arrive at the center computer 0.5 (=1.0/2) seconds after its input.

Thus, with the transaction control system of the first embodiment, transaction information is notified simultaneously to the users of all the terminal devices when a time determined by "reference time/2" from the time point of its transmission has elapsed. Also, transaction requests input from all terminal devices always arrive at the center computer after a time determined by "reference time/2" from their input time point has elapsed.

Consequently, with this transaction control system, the users of all the terminal devices are given equitable dealing opportunities.

The following modifications may be made to the transaction control system of the first embodiment.

The function corresponding to reference time updating unit 12 may be removed from center computer 100 and it may be arranged that the longest of the first transmission times is always employed as reference time. A system can also be constituted wherein the reference time signal is transmitted separately from the second response signal.

It is also possible to arrange for the calculation of adjustment time to be performed at the center computer. Specifically, the center computer is given the function of calculating the adjustment time for the respective terminal devices from the reference time and first transmission time measured for each terminal device, and the function of notifying each terminal device of the calculated adjustment time. Each terminal device is then provided with a function, instead of adjustment time setting time unit 32, of storing the adjustment time that is notified to it from the center computer. Thus, with a transaction control system as constituted above, all market participants are given equitable dealing opportunities just as in the case of the transaction control system of the first embodiment.

It is also possible for a system to be constituted such that processing corresponding to the initial period processing is performed cyclically. With a system constituted in this way, a transaction control system can be obtained that can automatically cope with alterations in the route used for communication.

Furthermore, the terminal devices may be constituted by providing, instead of transaction information delay receiving unit 35, a receiving unit that outputs transaction information corresponding to the transaction information signal that it received, and by arranging for transaction request delay transmission unit 36 to perform delay processing in the amount of 2×adjustment time. In this case, the users of the terminal devices are not able to acquire transaction information simultaneously. However, if the users of the various terminal devices input transaction requests in respect of transaction information immediately on receiving it, the center computer will receive these transaction requests simultaneously. Equality of dealing opportunity can therefore be guaranteed with this construction also. In the reverse arrangement, it could of course be arranged for the terminal devices to be constituted such that delay processing in the amount of 2×adjustment time is performed only in transaction information delay receiving unit 35.

Also, by removing from the system all parts relating to initial period processing, and by providing an adjustment time storage unit that stores the adjustment time in each terminal device, it could be arranged to set an adjustment time when a terminal device is installed, corresponding to its position of installation, manually in the adjustment time storage unit.

Second Embodiment

The transaction control system of the first embodiment was a system wherein the time adjustment was performed at the terminal devices. In contrast, in the transaction control system of the second embodiment, the time adjustment is performed at the center computer.

Figure 6:
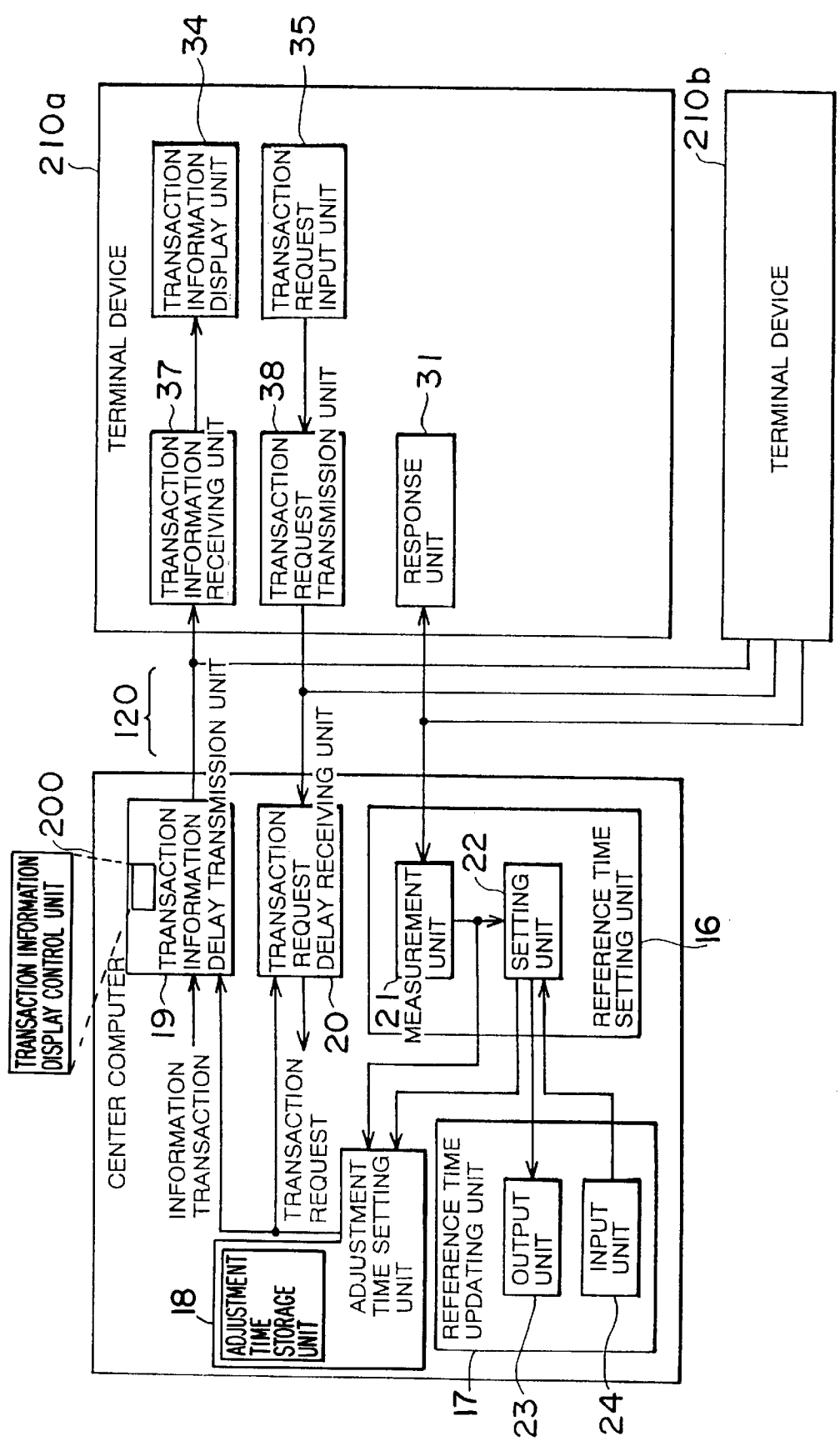
FIG. 6 is a functional block diagram of the transaction control system of a second embodiment.

The operation of a transaction control system according to the second embodiment will now be described using the function block diagram shown in FIG. 6. The hardware construction of the transaction control system of the second embodiment is the same as the hardware construction of the transaction control system of the first embodiment, so further description is omitted.

As shown, in terminal device 210, adjustment time setting unit 32 is removed from terminal device 110 in the transaction control system of the first embodiment, and, instead of transaction information delay receiving unit 33 and transaction request delay transmission unit 36 there are respectively provided transaction information receiving unit 37 and transaction request transmission unit 38.

Transaction information receiving unit 37 immediately converts transaction information signals which it receives into transaction information, and outputs the transaction information obtained by this conversion to transaction information display unit 34. When transaction request transmission unit 38 is supplied with a transaction request from transaction request input unit 35, it transmits to center computer 200 a transaction request signal corresponding to this transaction request. That is, terminal device 210a sends and receives signals without making any time adjustment at all.

The CPU in center computer 200 makes center computer 200 function as a device consisting of a reference time setting unit 16, reference time updating unit 17, adjustment time setting unit 18, transaction information delay transmission unit 19, and transaction request delay receiving unit 20.

The processing executed by the transaction control system of the second embodiment can be classified into the initial period processing and the ordinary processing performed subsequently. In the initial-period processing, reference time setting unit 16 and reference time updating unit 17 and adjustment time setting unit 18 in center computer 200, and response unit 31 in the terminal devices perform their function.

Reference time setting unit 16 is equipped with a measurement unit 21 and setting unit 22. Measurement unit 21 and setting unit 22 perform practically the same action as measurement unit 21 and setting unit 22 in the transaction control system of the first embodiment. However, measurement unit 21 in reference time setting unit 16 outputs to adjustment time setting unit 18 the various first transmission times determined from the first response signals from response units 31. Also, setting unit 22 in reference time setting unit 16 outputs to adjustment time setting unit 18 the set reference time.

Reference time updating unit 17 performs exactly the same action as reference time updating unit 14 in the transaction control system of the first embodiment.

Adjustment time setting unit 18 performs an action similar to adjustment time setting unit 32 provided in terminal device 110 in the transaction control system of the first embodiment. Specifically, adjustment time setting unit 18 calculates an adjustment time in accordance with the following equation, using the reference time given by reference time setting unit 16 and the first transmission times in respect of each terminal device 110.

Adjustment time=(reference time minus first transmission time)/2.

If a negative adjustment time is obtained as the adjustment time in respect of a terminal device 210, adjustment time setting unit 18 stores "0" as the adjustment time of this terminal device 210.

After calculating the adjustment time in respect of each terminal device 110, adjustment time setting unit 18 notifies the correspondence relationship of the terminal devices and adjustment times to transaction information delay transmission unit 19 and transaction request delay reception unit 20.

This notification results in a condition in which ordinary processing can be executed.

When transaction information delay receiving unit 19 receives as input transaction information that is to be notified to terminal devices 210, it stores this transaction information. Then, when a time designated by each adjustment time has elapsed from the time point of input of the transaction information, it sends a transaction information signal corresponding to the transaction information to the terminal device 210 with which this adjustment time is associated.

If it receives a transaction request signal from a given terminal device 210, transaction request delay reception unit 20 outputs a transaction request corresponding to this transaction request signal on the lapse of the adjustment time for this terminal device 210 after the time point of its reception.

Figure 7:
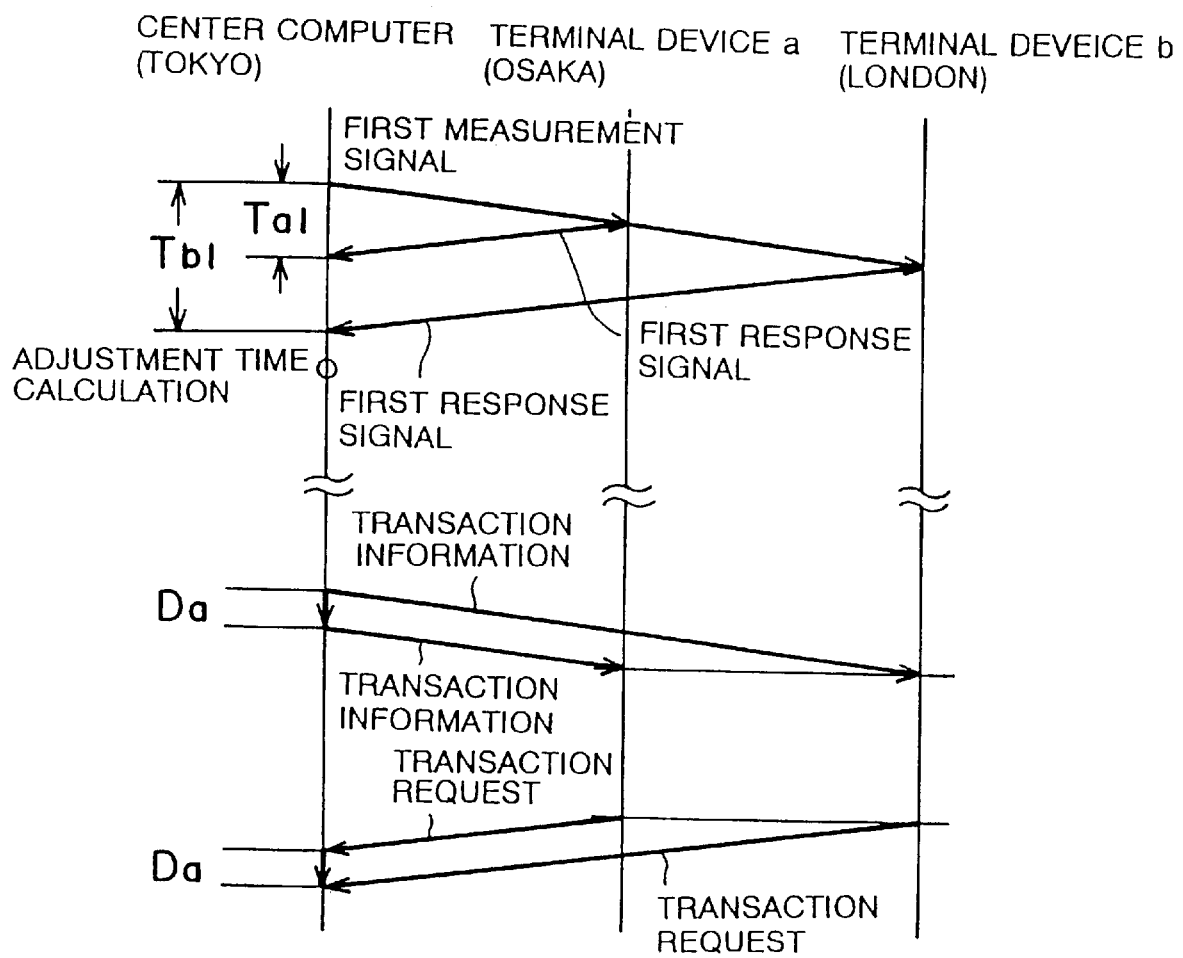
FIG. 7 is a signal sequence diagram in a transaction control system of the second embodiment.
Figure 8:
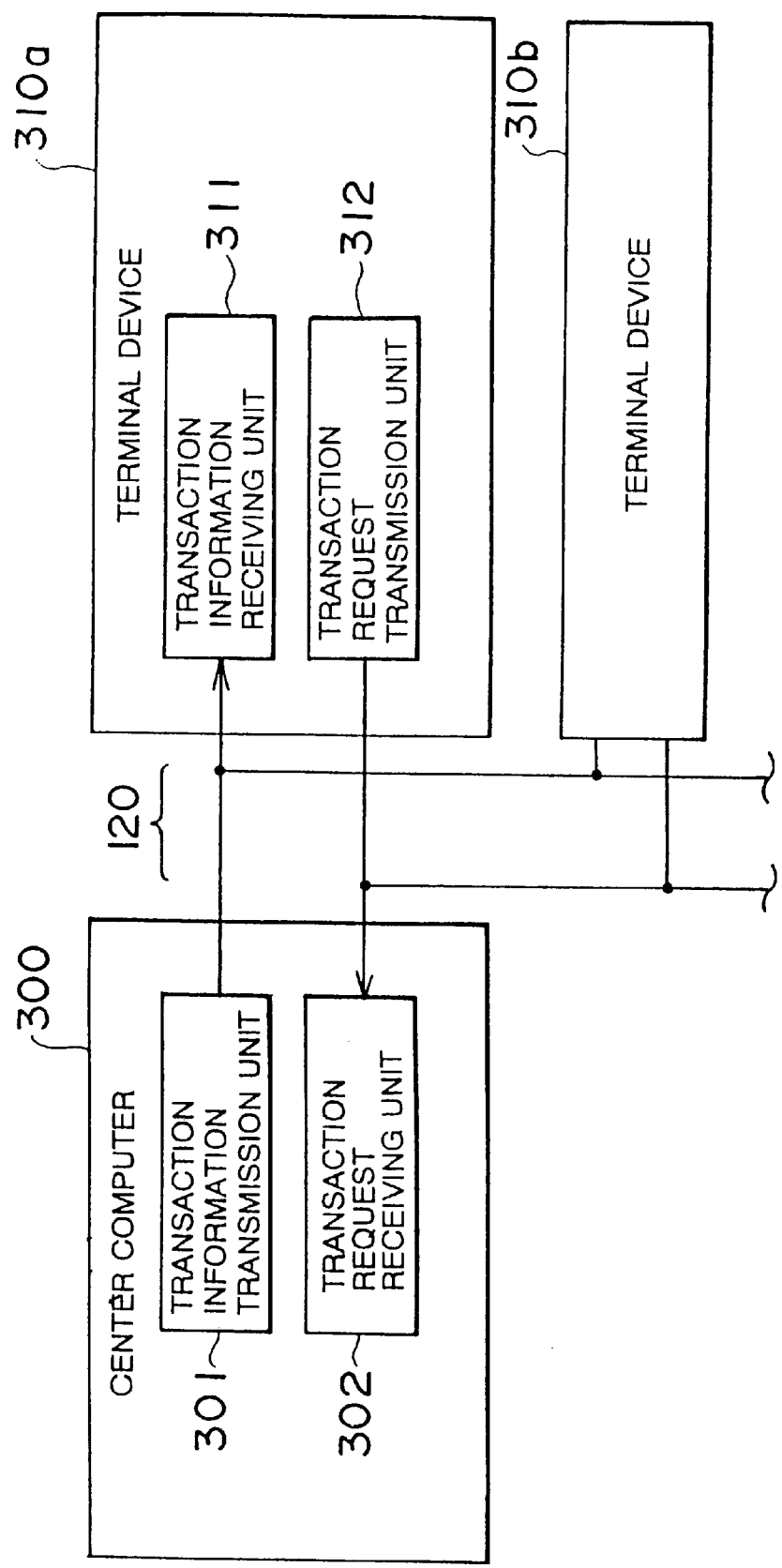
FIG. 8 is a functional block diagram of a prior art transaction control system.

The operation of a transaction control system according to the second embodiment is described more concretely below using the signal sequence chart (FIG. 7). It will be assumed that the center computer in FIG. 7 is located in Tokyo while the two terminal devices a, b are respectively located in Osaka and London.

In this transaction control system, as shown in the Figure, a first measurement signal is sent simultaneously from the center computer to each of the terminal devices. Each terminal device transmits a first response signal when it receives the first measurement signal. The center computer measures for each terminal the time from transmission of the first measurement signal up to reception of the first response signal (i.e. the first transmission time). The center computer then takes the longest of the first transmission times that are thus measured and stores this, and calculates the adjustment time for each terminal device and stores this adjustment time.

For example, if first transmission time Ta1 in respect of terminal device a located in Osaka is 0.7 seconds and first transmission time Tb1 relating to terminal device b located in London is 1.0 seconds, the center computer stores the first transmission time Tb1 (=1.0 seconds) relating to terminal device b as reference time. The center computer then stores 0.15 seconds (=(1.0 minus 0.7)/2) as the adjustment time Da relating to terminal device a. Also, the center computer stores 0 seconds (=(1.0 minus 1.0)/2) as adjustment time Db relating to terminal device b.

After the adjustment times relating to all the terminal devices have thus been stored in the center computer, ordinary processing is commenced.

For example, when transaction information to be notified to each terminal device has been generated, this system operates as follows.

The center computer stores 0.15 seconds as the adjustment time Da relating to terminal device a and stores 0 seconds as adjustment time Db relating to terminal device b. The center computer therefore sends a transaction information signal corresponding to the transaction information immediately to terminal device b after generation of transaction information that is to be transmitted to all terminal devices. The center computer then waits for a period of 0.15 seconds after generation of the transaction information before sending a transaction information signal corresponding to this transaction information to terminal device a.

The first transmission time relating to terminal device b is 1.0 seconds, so terminal device b receives the transaction information signal 0.5 seconds after the transaction of the transaction information signal by the center computer, and displays the details thereof. That is, terminal device b divulges the details of the transaction information to the market participant 0.5 (0 plus 0.5) seconds after the generation of the transaction information. Also, since the first transmission time relating to terminal device a is 0.7 seconds the terminal device a receives the transaction information signal 0.35 (=0.7/2) seconds after transmission of the transaction information signal by the center computer, and displays the details thereof. That is, terminal device a divulges the details of the transaction information to the market participant after 0.5 (=0.15+0.35) seconds after generation of the transaction information.

Also, this system operates as follows when a transaction request is input to the terminal devices.

When a transaction request is input, terminal device a immediately sends a transaction request signal to the center computer. Since the time required for arrival of this transaction request signal at the center computer is 0.35 seconds, the transaction request from terminal device a arrives at the center computer after the lapse of 0.5 seconds after the time point of its input.

The center computer stores 0.15 seconds as the adjustment time Da relating to terminal device a. Consequently, the center computer executes processing of the transaction request corresponding to this transaction request signal after waiting for 0.15 seconds after receiving the transaction request signal from terminal device a. That is, the center computer executes processing for the transaction regarding the transaction request as having been received 0.5 (0.35 plus 0.15) seconds later than the input of the transaction request at terminal device a.

In contrast, the center computer stores 0 seconds as adjustment time Db relating to terminal device b. The center computer therefore executes processing in respect of the transaction request corresponding to this transaction request signal immediately this transaction request signal is received from terminal device b. That is, the center computer executes processing for the transaction regarding the transaction request as having been received 0.5 (0.5 plus 0) seconds after this transaction request has been input at terminal device b.

Thus, with the transaction control system of the second embodiment, transaction information is notified to the users of all the terminal devices simultaneously on the lapse of a time determined by "reference time/2" from the time point where the transaction information was generated. Also, transaction requests that are input at the respective terminal devices are employed for dealing by the center computer on the lapse of a time determined by "reference time/2" from the time point of input of the request.

Consequently, the users of all the terminal devices are given equitable dealing opportunities.

The transaction control system of the second embodiment may be modified as follows.

It may be arranged to remove the function corresponding to reference time updating unit 12 from center computer 200 and to always employ the longest of the first transmission times as the reference time.

It is also possible to constitute the system such that the processing corresponding to initial-period processing is performed cyclically. If the system is constituted in this way, a transaction control system is obtained that can cope automatically with alterations in the route used for communication.

Furthermore, in place of the transaction information delay transmission unit 19, it is possible to provide a transmission unit that outputs a transaction information signal corresponding to input transaction information immediately, and to constitute the center computer such that delay processing in the amount of 2×adjustment time is performed by the transaction request delay receiving unit 20. In the alternative, it is of course possible to constitute the center computer such that delay processing in the amount of "2×adjustment time" is performed only by the transaction information delay transmission unit 19.

It is apparent that, in this invention, a wide range of different working modes can be formed based on the invention without deviating from the spirit and scope of the invention. This invention is not restricted by its specific working modes except being limited by the appended claims.

What is claimed is:

1. A transaction control system, having a time delay adjustment transmission mechanism, comprising:

a center computer; and a plurality of terminal devices connected through communication circuits to said center computer, said center computer including transaction information transmission means for transmitting transaction information simultaneously to the plurality of terminal devices through the communication circuits; and transaction request receiving means for receiving transaction requests sent by the terminal devices through the communication circuits, and said plurality of terminal devices respectively including adjustment time storage means for storing an adjustment time determined on the basis of the difference between the transmission time needed for exchange of information with the center computer and a reference time which is the reference of the transmission time;

transaction information receiving means for receiving transaction information sent by the center computer;

transaction information display control means for supplying transaction information received by said transaction information receiving means when the adjustment time stored in said adjustment time storage means has elapsed from the time point of its receipt;

transaction information display means for displaying the transaction information that is supplied by the transaction display control means when the adjustment time has elapsed from the time point of its receipt;

transaction request input means for inputting transaction requests; and transaction request transmission means for transmitting to the center computer a transaction request input by said transaction request input means when the adjustment time stored in the adjustment time storage means has elapsed from the time point of its input.

2. A transaction control, system having a time delay adjustment transmission mechanism, comprising:

a center computer; and a plurality of terminal devices connected to said center computer through communication circuits, said center computer including transaction information transmission means for transmitting transaction information through the communication circuits simultaneously to the plurality of terminal devices; and transaction request receiving means for receiving the transaction requests sent by the terminal devices through the communication circuits, and each of said plurality of terminal devices including adjustment time storage means for storing an adjustment time determined on the basis of the back-and-forth transmission time required for information exchange with said center computer and the reference time which is the reference of the back-and-forth transmission time;

transaction information receiving means for receiving transaction information sent by said center computer;

transaction information display means for displaying the transaction information received by said transaction information receiving means when the adjustment time has elapsed from a time point of its receipt;

transaction request input means for inputting transaction requests; and transaction request transmission means for sending to the center computer a transaction request input by said transaction request input means on the lapse of the adjustment time stored in said adjustment time storage means from the time point of its input.

3. A transaction control system, having a time delay adjustment transmission mechanism, comprising:

a center computer; and a plurality of terminal devices connected to said center computer through communication circuits, said center computer including transaction information transmission means for transmitting transaction information simultaneously to the plurality of terminal devices through the communication circuits; and transaction request receiving means for receiving transaction requests sent by the terminal devices through the communication circuits, and each of said plurality of terminal devices including adjustment time storage means for storing an adjustment time determined on the basis of the back-and-forth transmission time required for information exchange with the center computer and the reference time which is the reference of the back-and-forth transmission time;

transaction information receiving means for receiving transaction information sent by the center computer;

transaction information display control means for supplying transaction information received by said transaction information receiving means when the adjustment time stored in the adjustment time storage means has elapsed from the time point of its receipt;

transaction information display means for displaying the transaction information that is supplied by the transaction display control means when the adjustment time has elapsed from the time point of its receipt;

transaction request input means for inputting transaction requests; and transaction request transmission means for transmitting to the center computer transaction requests input by this transaction request input means.

4. The transaction control system according to claim 1, wherein said center computer further comprises:

first transmission time measurement means for measuring for the respective plurality of terminal devices first transmission times constituting the time needed to perform information exchange;

reference time setting means for setting as the reference time the longest of the first transmission times relating to the respective terminal devices measured by this first transmission time measurement means; and reference time transmission means for transmitting to each terminal device the reference time set by this reference time setting means, and each of said plurality of terminal devices additionally comprises:

reference time receiving means for receiving the reference time transmitted by said reference time transmitting means in the center computer;

second transmission time measurement means for measuring a second transmission time, which is the time needed for information exchange with the center computer; and adjustment time setting means for setting in the adjustment time storage means as adjustment time half of the value obtained by subtracting the second transmission time measured by the second transmission time measurement means from the reference time received by the reference time receiving means.

5. The transaction control system according to claim 4, wherein said center computer further comprises:

reference time display means for displaying the reference time set by the reference time setting means; and reference time input means for inputting a new reference time, and wherein said reference time transmission means transmits to each terminal device the reference time that is input by this reference time input means.

6. A center computer connected to a plurality of terminal devices through communication circuits, said center computer comprising:

adjustment time storage means for storing an adjustment time which is respectively associated with the plurality of terminal devices and is determined on the basis of the back-and-forth transmission time required for exchange of information with the corresponding terminal device and the reference time which is the reference of the back-and-forth transmission time;

transaction information transmission means for transmitting input transaction information to the terminal device corresponding to this adjustment time when each adjustment time stored in the adjustment time storage means has elapsed from the time point of input of the transaction information; and transaction request receiving means for receiving transaction requests constituting response information in respect of the transaction information sent from each terminal device, and that outputting the received transaction information on the lapse of an adjustment time stored in the adjustment time storage means from the time point of its reception; and transaction information display means for displaying the transaction information when the adjustment time has elapsed from the time point of its receipt.

7. A center computer connected to a plurality of terminal devices through communication circuits, said center computer comprising:

adjustment time storage means for storing an adjustment time which is respectively associated with the plurality of terminal devices and which is determined on the basis of the back-and-forth transmission time required for exchange of information with the corresponding terminal device and the reference time which is the reference of the back-and-forth transmission time;

transaction information transmission means for transmitting input transaction information to the terminal device corresponding to this adjustment time when each adjustment time stored in the adjustment time storage means has elapsed from the time point of input of the transaction information; and transaction request receiving means for receiving a transaction request constituting response information in respect of the transaction information sent by each terminal device and outputting the received transaction information; and transaction information display means for displaying the transaction information when the adjustment time has elapsed from the time point of its receipt.

8. A center computer connected to a plurality of terminal devices through communication circuits, said center computer comprising:

adjustment time storage means for storing an adjustment time which is respectively associated with the plurality of terminal devices and which is determined on the basis of the back-and-forth transmission time required for information exchange with the corresponding terminal device and the reference time which is the reference of the back-and-forth transmission time;

transaction information transmission means for transmitting input transaction information simultaneously to the plurality of terminal devices; and transaction request receiving means for receiving transaction requests constituting response information in respect of the transaction information that has been transmitted by each terminal device, and outputting the received transaction information when the adjustment time stored in said adjustment time storage means has elapsed from the time point of its reception; and transaction information display means for displaying the transaction information when the adjustment time has elapsed from the time point of its receipt.

9. The center computer according to claim 8, further comprising:

transmission time measurement means for measuring the transmission time in respect of the plurality of terminal devices;

reference time setting means for setting as the reference time the longest of the transmission times in respect of the terminal devices measured by this transmission time measurement means; and adjustment time setting means for setting in the adjustment time storage means as adjustment time in respect of each terminal device half of a value obtained by subtracting from the reference time set by said reference time setting means each transmission time measured by said transmission time measurement means.

10. The center computer according to claim 8, further comprising:

reference time display means for displaying the reference time set by the reference time setting means; and reference time input means for inputting a new reference time, and wherein said adjustment time setting means uses in the calculation of the adjustment time the reference time that is input by the reference time input means.

* * * * *